United States Patent [19]

Knapp

[11] Patent Number: 4,841,549

[45] Date of Patent: Jun. 20, 1989

[54] SIMPLE, HIGH PERFORMANCE DIGITAL DATA TRANSMISSION SYSTEM AND METHOD

[76] Inventor: Stephen L. Knapp, 1776 Oakdale St., Pasadena, Calif. 91106

[21] Appl. No.: 170,551

[22] Filed: Mar. 21, 1988

[51] Int. Cl.[4] .............................................. H04L 7/04
[52] U.S. Cl. ..................................... 375/111; 375/106
[58] Field of Search ................... 375/111, 113, 7, 106; 370/110.1, 101

[56] References Cited

U.S. PATENT DOCUMENTS

| | | | |
|---|---|---|---|
| 4,187,394 | 2/1980 | Sievers | 375/36 |
| 4,271,510 | 6/1981 | Looschen | 375/36 |
| 4,562,581 | 12/1985 | Tanaka | 375/7 |
| 4,580,129 | 4/1986 | Bahgat | 375/21 |
| 4,644,563 | 2/1987 | Ohishi | 375/20 |
| 4,654,653 | 3/1987 | Brindle | 375/117 |
| 4,756,025 | 7/1988 | Munz et al. | 375/111 |

*Primary Examiner*—Benedict V. Safourek
*Assistant Examiner*—Marianne Huseman

[57] ABSTRACT

A high performance asynchronous system and method for continuous communication of data from an originating station to a destination station. Data messages are transmitted over one or more transmission channels between the two stations, and a timing message is transmitted over another transmission channel. The data messages are divided into logical groups, called words. The timing message contains a periodic signal for synchronizing the reception of the data messages. The data word groups are identified by interrupting the timing signals in the timing message.

8 Claims, 8 Drawing Sheets

SIMPLE, HIGH PERFORMANCE DIGITAL DATA TRANSMISSION SYSTEM AND METHOD

BACKGROUND AND OBJECT OF THE INVENTION

The invention disclosed herein relates generally to improved digital communication means and methods, and more particularly to a system and method for high performance asynchronous communications between digital systems.

In optical astronomy, and in many other fields, digital computers and other electronic machines are increasingly used for equipment control, data acquisition and transfer, and other purposes which involve communications of digital data. As electronic machinery has been developed and improved, especially in recent years, there has been increasing need for high performance data links. By "high performance" is meant high speed communication of digital data over distances sufficiently great that the length of the communications channel medium, such as transmission cable, is a determining factor in the maximum data transfer speed with insignificant error rate.

Maximum performance of transmission lines is governed by physical principles. For conducting cables, the maximum bit rate decreases as the square of the distance. For optical cables, the maximum bit rate decreases as the first power of the distance. In the prior art, high performance data transmission rates have been obtained by techniques which tend to be complex and expensive. Moreover, there has been little or no provision for easily adjusting the data rate for maximum performance according to the distance. Furthermore, prior art methods to synchronize sequences of consecutive bits into logical groupings, called "words", have been complex and expensive.

A principal object of the invention described herein is to provide a data communication link which maximizes data transfer speed, transfer distance, reliability, and maintainability and which minimizes system cost, complexity, and data transfer error rate. Another object is to provide a system in which the data transmission rate can be altered to adapt the system to a particular transmission medium and in which a message can be separated easily into logical words.

SUMMARY OF THE INVENTION

According to the present invention, a high performance data transmission system and method is implemented between two points separated by a distance of several kilometers or more. The system has a transmitting subsystem at the point of origin, a receiving subsystem at the destination, and a pair of message channels joining the two subsystems. In the following description an individual transmission line or cable, whether conducting or optical or other, will be treated as a single message channel. It will be understood, however, that more than one channel may be possible under some circumstances. The remainder of the description applies to each such channel as if it were a separate line or cable.

If communications are desired in both directions between two points then two independent such transmission systems are to be established, one in each direction. For the bulk of the following description, only one such system will be considered, with the understanding that two (or more) such systems might in fact be appropriate.

Throughout the following discussion the convention is adopted for clarity that only one message channel is provided for the purpose of transmitting data information. It should be understood that if desired, more than one identical message channel, operating simultaneously, may be employed, to transmit a plurality of data messages in parallel.

One of the transmission lines is used to transmit a timing clock signal of fixed frequency of pulses and the other transmission line is used to transmit binary digital messages in synchronism with the aforesaid timing signal. The frequency of the timing signal is selected according to the distance between the two end points joined by the transmission lines, and other factors, in order to provide a high rate of transfer of the messages without confusion or avoidable errors. The messages are transmitted as a sequence of a plurality of digital bits, and are called words. The words are demarked in the method of this invention by effecting the interruption of the the sequence of clock timing pulses, after a plurality of consecutive clock pulses in number equal to the number of bits in the preceeding message word, for an interval lasting at least long enough to be detected correctly by the receiving subsystem as the sync interval. The number of bits in a message word may not exceed some maximum value, referred to herein as N bits.

The transmitting subsystem consists of several parts: A parallel-to-serial convertor of N bits; a timing generator means for producing and interrupting the periodic timing clock signals for advancing the parallel-to-serial convertor; and transmission line driver means for the timing signal pulses and for the serial message bit signals from the parallel-to-serial convertor. The timing generator contains a clock timing oscillator of approximately 50% duty factor, of which the frequency is easily set and is stable to an uncertainty of about 1 part in 10 or better. This timing generator also contains means for interrupting the sequence of clock pulses for a fixed time, usually at least one clock cycle, so as to mark the end of one message word and the beginning of another message word; the interruption interval thus becomes the basis from which to derive a word synchronization signal ("sync signal") from the clock timing signal. The sync signal is used at the transmitting subsystem to load the next input message to the parallel-to-serial convertor. An N bit input buffer may be inserted between the user equipment, which is the origin of the message words to be transmitted, and the parallel-to-serial convertor. The sync signal produced by the timing generator may be used to provide a so-called "handshaking" signal to inform the originating user equipment that a new message word may be applied to the parallel-to-serial convertor or input buffer.

The receiving subsystem consists of several parts: line receiver means for detecting the timing and message signals from the transmission lines with adequate discrimination against noise; a serial-to-parallel convertor of N bits; and a timing regenerator means for producing from the received timing clock signal the message word sync pulses and the signals for advancing the serial-to-parallel convertor. The timing regenerator contains a "missing pulse detector" which produces a message word sync signal in response to the interruption in arrival of clock pulses. A parallel latch, or register, of N bits may be inserted between the serial-to-parallel convertor and the user equipment, which is the ultimate destination of the message words to be received. Such a latch is clocked, or triggered, by the sync signal from the missing pulse detector. The sync signal produced by the timing regenerator may be used to provide a so-called "handshaking" signal to inform the destination user equipment that a new message word is available from the serial-to-parallel convertor or output latch.

The value of the timing clock frequency may be chosen to allow the fastest rate of data message transfer without error due to degradation caused by the lengths of the transmission lines, as mentioned in an earlier part of this specification.

The stability and accuracy of the clock timing oscillator at the transmitter is determined by the characteristics of the timing components. It is easy to achieve a stability of 10% peak to peak over a range in ambient temperature of around 100° C. with simple RC-controlled multivibrator. Normally an integral number of clock pulses will be omitted in order to develop the sync signal, but this is not necessary so long as the clock signal is missing for an interval long enough to be identified unambiguously.

The stability and accuracy of the timing of the missing pulse detector circuit at the receiving subsystem must be such as to always correctly identify the word sync interval when the received clock signals are interrupted. Two factors dictate the required accuracy of the timing of the missing pulse detector: (a) the fractional number M of clock periods omitted by the transmitter clock generator to produce the word sync interval; and (b) the peak-to-peak variation from nominal in the transmitter clock period supplied by the timing generator. The following analysis makes this clear.

Suppose that M is the fractional number of clock periods omitted by the transmitter clock generator. Let $T_R$ be the optimum interval, in clock periods, after the start of the last transmitter clock for detecting the omission of the clocks. Let V denote the peak-to-peak variation due to all causes of the transmitter clock period, expressed as a percentage of the nominal value. Then TABLE 1 relates the allowable errors in $T_R$ as signed percentages for various combinations of M and V (also shown are the values of $T_R$ for each value of M):

TABLE 1

| M | 0.50 | 1.00 | 1.50 | 2.00 | 2.50 | 3.00 |
|---|---|---|---|---|---|---|
| $T_R$ | 1.25 | 1.50 | 1.75 | 2.00 | 2.25 | 2.50 |
| V = ± 00% | ±20 | ±33 | ±43 | ±50 | ±56 | ±60 |
| V = ± 10% | +08−12 | +20−27 | +30−37 | +35−45 | +40−51 | +44−56 |
| V = ± 20% | NA | +07−20 | +14−31 | +20−40 | +24−47 | +28−52 |

Inspection of TABLE 1 leads to several conclusions. First, values of M smaller than about 1.00 require transmitter precision better than about V=±10% for allowable errors in $T_R$ of 10%. Second, values of M much greater that 2.00 do not gain very much of practical value in allowable errors, but actually reduce the system bandwidth unnecessarily. M=1.00 is an efficient choice and is simple to accomplish with simple logic circuits. This choice is demonstrated in the description of preferred embodiments in a later part of this specification.

The method and system in this invention is normally in continuous operation. There is a unique one-to-one correspondance between bits in the message word input at the transmitter from the user equipment and bits in the message word output to the user equipment at the receiver. The received output message word takes on the digital value of the transmitter input message word after a time interval not greater than approximately the sum of the travel time for electromagnetic radiation in the transmission lines from transmitting to receiving subsystems and the time interval between successive word sync signals. Because the word synchronization events occur without regard to the internal timing of the destination equipment (or of the originating equipment), the method and system of this invention is termed "asynchronous."

The present invention provides a simple, low-cost method and system for high performance one-way direct transfer of digital data between two widely separated locations. When bi-directional transfer of digital data is desired between two such locations then two independent such systems should be used, one in each direction. The specific nature of the invention as well as other advantages, features, and uses thereof will become readily apparent from the following description of a preferred embodiment of the invention taken in conjunction with the accompanying drawings.

DESCRIPTION OF PREFERRED EMBODIMENTS

In this description of preferred embodiments, the convention is adopted to describe the parallel-to-serial conversion means and serial-to-parallel conversion means respectively as parallel-to-serial and serial-to-parallel shift registers, although other implementations (for example employing random-access memories) are possible.

Figure 1:
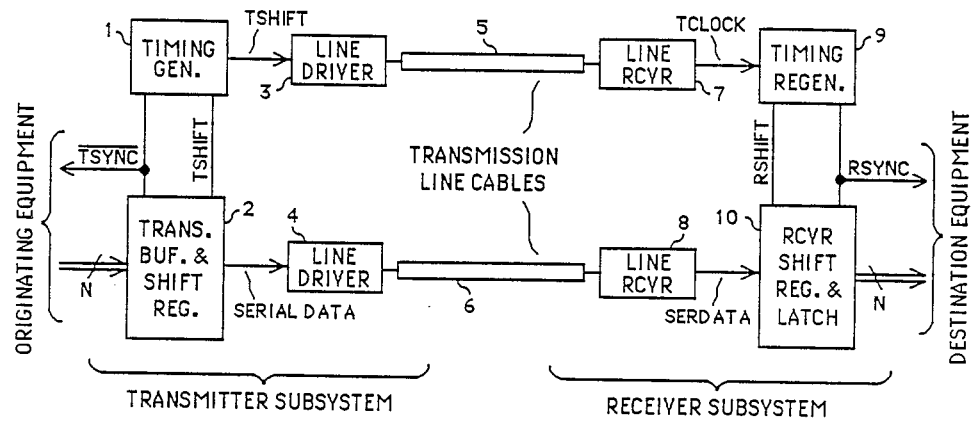
FIG. 1 is an overall block and electrical diagram generally illustrating an asynchronous, one-way digital data communication apparatus, with a transmitting subsystem, a receiving subsystem, and two transmission lines connecting them, in accordance with the present invention.

Reference is directed initially to FIG. 1, which is an overall block and electrical diagram of the data transmission system in one direction. The system consists of a transmitter subsystem where the data enters the system, of a receiver subsystem where the data leaves the system, and a pair of transmission lines connecting these two subsystems. The transmitter subsystem consists of timing generator 1, transmitter buffer/shift register 2, and line drivers 3 and 4. The receiver subsystem consists of line receivers 7 and 8, timing regenerator 9, and receiver shift register/latch 10. The two transmission lines 5 and 6 must be closely identical in electrical length and temporal propagation characteristics. The said transmission lines may be conducting cables, either coaxial or twisted pair, or optical cables.

It is to be understood in this discussion that N represents a maximum number of sequential binary data bits to be communicated as comprising a single "word", as discussed above in the background section of this document. Usually, the number N is chosen for each application of the present invention, according to the particular needs in question; it is possible for the number of bits to vary from word to word, providing that it is not greater than N. In several places in the following discussion references are made to electronic circuits, specifically integrated circuits (abbreviated "IC"), which are functional in nature. Often functions using N bits are discussed. When necessary, as may be in the cases of shift registers, buffers, and latches, it is conventionally understood that integrated circuits are joined (often called "cascaded") in series or in parallel in order to amount to N bits over all. If a particular number type of integrated circuit is mentioned in the following, it is to be understood that plural such devices are meant if N requires them even though a singular number is stated.

For purposes of illustration, the preferred embodiment in this description is shown for the case N=12. This is most obvious in FIG. 4 and in FIG. 7.

Figure 2:
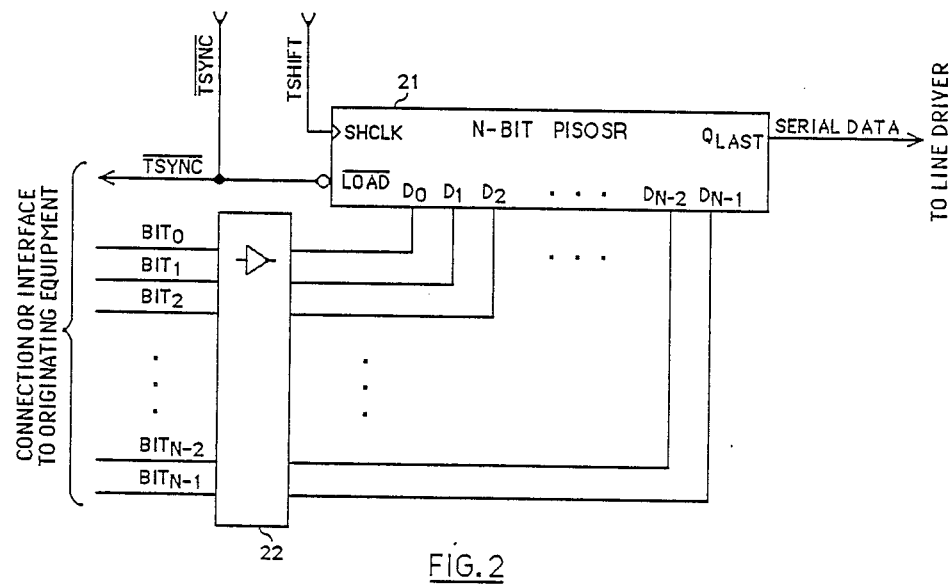
FIG. 2 is an electrical diagram illustrating in greater detail the parallel-to-serial convertor (shift register) data transmitter of the transmitting subsystem of FIG. 1.

An embodiment of the transmitter buffer/shift register 2 is shown in FIG. 2. The N bit shift register 21 is of the parallel in, serial out variety (PISOSR). The user data word of N bits, $BIT_O$ through $BIT_{N-1}$, is presented to the PISOSR parallel data inputs $D_i$. It is not necessary but is often desirable to include N bit buffer 22 between the originating equipment and the PISOSR. There are two other input signals to the PISOSR. The exact nature of these two signals depends on the particular PISOSR device used. In the particular embodiment of FIG. 2 the chosen PISOSR is the type, such as 74LS165 or 74F597, which has an asynchronous load control input for loading the shift register and a separate clock input for shifting the data bits. The signal $\overline{TSYNC}$ is connected to the load input and the signal TSHIFT is connected to the clock input. The output signal of the PISOSR, SERIAL DATA, is connected to the line driver 4.

As shown in FIG. 1 and in FIG. 2 the signal $\overline{TSYNC}$ may be used to inform the originating equipment when a new data word may be applied to the transmitter subsystem, and may thus be the basis for a "handshaking" signal process.

Figure 3:
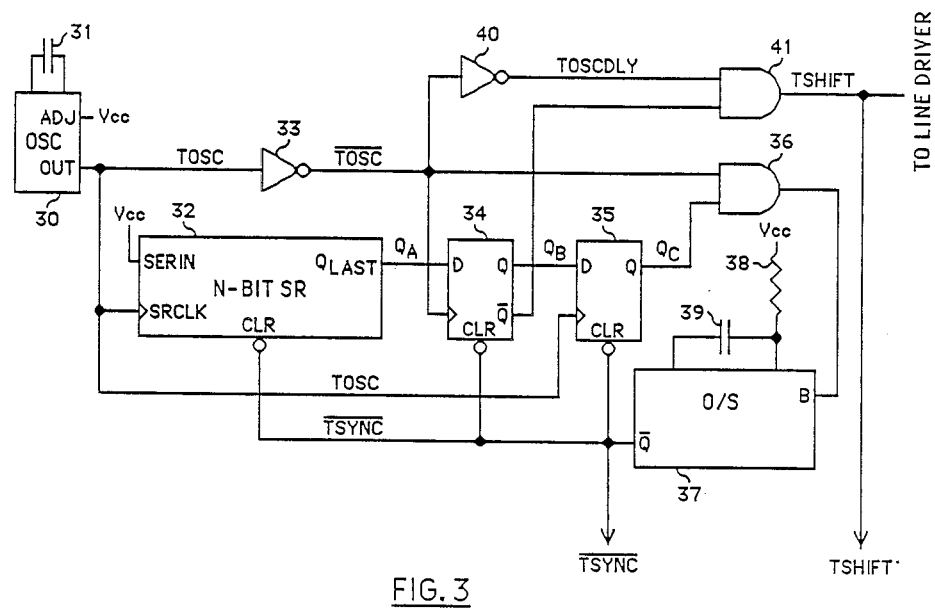
FIG. 3 is an electrical diagram illustrating in greater detail the timing generator of the transmitting subsystem of FIG. 1.
Figure 4:
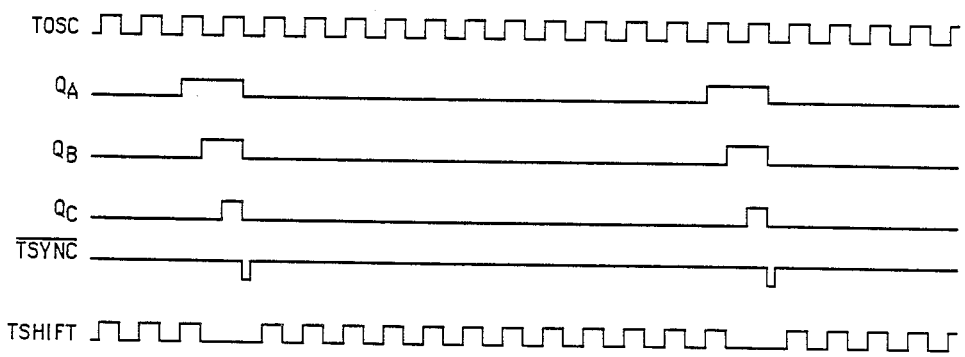
FIG. 4 is a series of graphs illustrating the operation of the timing generator of FIG. 3.

A particularly advantageous embodiment of the timing generator 1 is shown in FIG. 3, which may be better understood by reference to FIG. 4, which is a timing diagram for the signals of FIG. 3. Free running oscillator 30 is the source of the continuous pulses TOSC, and the frequency of said oscillator is chosen with regard to the length of the transmission lines 5 and 6, as discussed in the background section of this document. The oscillator preferred in this embodiment is based on the 74S124 or 74S124 integrated circuit; this IC provides an output with a duty factor of approximately 50%. The 74S124 IC is an oscillator of the voltage controlled (VCO) type, one of which the oscillation frequency is adjustable about some nominal value by means of an applied voltage. In FIG. 3 the VCO adjustment terminal is shown connected to $V_{CC}$. The stability of the oscillation frequency with the '124 IC's normally is determined primarily by capacitor 31, which is used to set the mean frequency of oscillation. A dipped mica capacitor provides satisfactory frequency stability and drift over a typical range of ambient temperature.

In FIG. 3 shift register 32, flip-flops 34 and 35, one-shot multivibrator 37, inverters 33 and 40, and gates 36 and 41 produce the transmitter clock and sync pulses. In this embodiment, shift register 32 is N bits in length, and has inputs for serial data, shift clock, and direct clear, and has an output for the last shift register stage. It may be desirable to use for 32 the same IC used either in the transmitter buffer/shift register 2 or receiver register 10. As a starting point consider the point in time when one-shot 37 is triggered, producing active low signal $\overline{TSYNC}$. The duration of $\overline{TSYNC}$ is determined by timing resistor 38 and capacitor 39 and is shorter than the time for one half cycle of TOSC. Because of gate 36, the triggering of $\overline{TSYNC}$ occurs at the rising edge of $\overline{TOSC}$. The occurance of $\overline{TSYNC}$ clears shift register 32 and the flip-flops 34 and 35. When flip-flop 34 is cleared, shift clocks, TSHIFT, become enabled by gate 41 passing on oscillator pulses, TOSCDLY, as delayed by inverters 33 and 40. As shown in FIG. 4, the output, $Q_A$, of shift register 32 goes high upon the 12th rising edge of TOSC subsequent to $\overline{TSYNC}$. Flip-flop 34 becomes set by the next rising edge of $\overline{TOSC}$, that is, one half clock cycle later. This event halts production of shift clocks, TSHIFT, until flip-flop 34 is again cleared, and is the start of the "missing pulses" and the word sync interval used at the receiver subsystem. Flip-flop 35 is set by the next rising edge of TOSC after the start of the sync interval and serves to allow the triggering of $\overline{TSYNC}$ at the next falling edge of the clock TOSC. As may be seen from FIG. 4, the combination of flip-flops 34 and 35 serves to omit shift clocks TSHIFT for one cycle of TOSC; this omission interval may be conveniently lengthened by increments of one half clock cycle by adding additional flip-flop stages between flip-flops 35 and 36 triggered by TOSC or $\overline{TOSC}$.

The signal TSHIFT is connected to the shift clock input of transmitter PISOSR 21 and to the line driver 3 for transmission to the destination receiver subsystem. The output pulse, $\overline{TSYNC}$, of the reset one-shot 37, is connected to the control input of the PISOSR 21 for loading the input data into the PISOSR and is made available to inform the user originating equipment that a new word may be applied to the transmitter subsystem.

Figure 5:
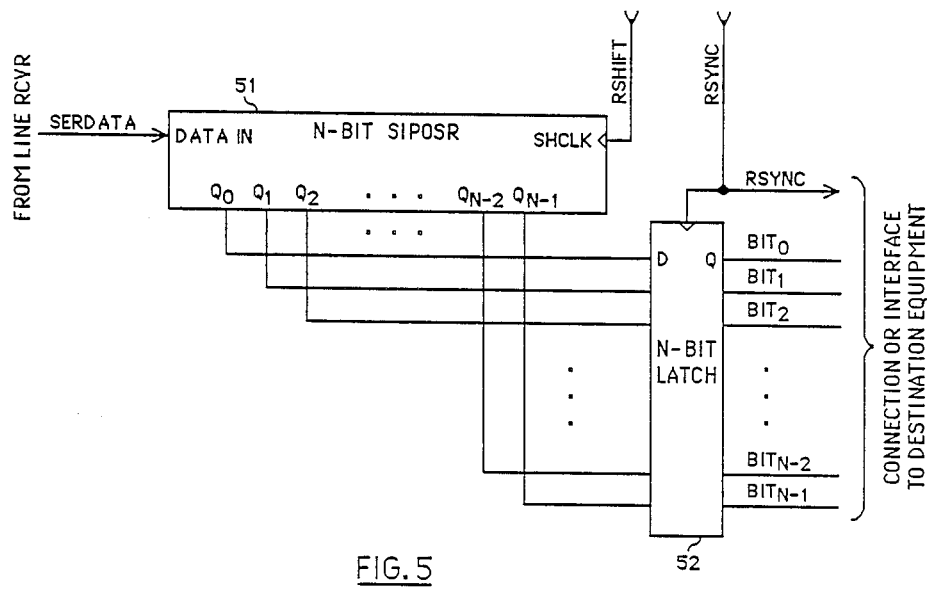
FIG. 5 is an electrical diagram illustrating in greater detail the serial-to-parallel convertor (shift register) data receiver of the receiving subsystem of FIG. 1.

An embodiment of the receiver shift register/latch 10 is illustrated in FIG. 5. The N bit shift register 51 is of the serial in, parallel out (SIPOSR) variety, such as IC type 74LS164. Incoming data signals from the line receiver 8, SERDATA, are applied to the data input terminal of the SIPOSR 51. The data bits are shifted across the SIPOSR by the shift pulses, RSHIFT, from the timing regenerator 9, which are applied to the shift clock input terminal of the SIPOSR 51. The sequential contents of the SIPOSR 51 are available at the N output terminals. $Q_O$ through $Q_{N-1}$. These output signals are applied to the inputs to the N bit latch 52. The latch 52 is clocked by the signal RSYNC from the timing generator 9. When this event occurs, the N output signals, $BIT_O$ through $BIT_{N-1}$, of the latch 52 take on the corresponding digital values of the contents of the SIPOSR 51. The N bit signals $BIT_i$ from the latch 52 thus constitute the most recent N bit data word presented to the user destination equipment.

As shown in FIG. 1 and FIG. 5 the receiver word sync signal, RSYNC, may be use to inform the user destination equipment that a new N bit word is available, and may thus be the basis for a "handshaking" signal process.

Figure 6:
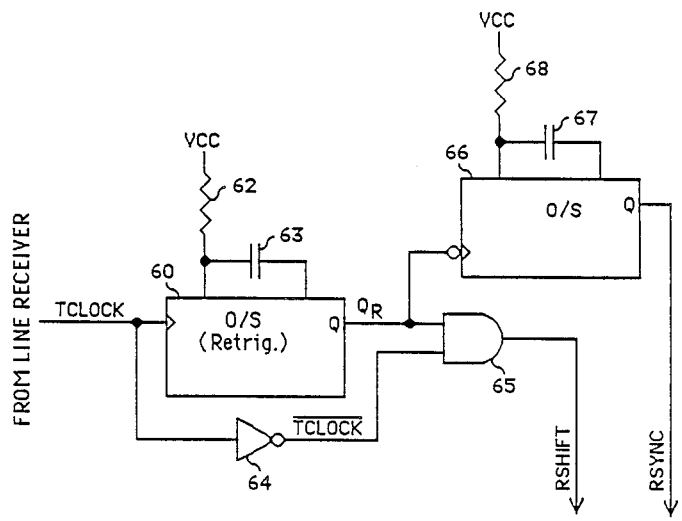
FIG. 6 is an electrical diagram illustrating in greater detail the timing regenerator of the receiving subsystem of FIG. 1.
Figure 7:
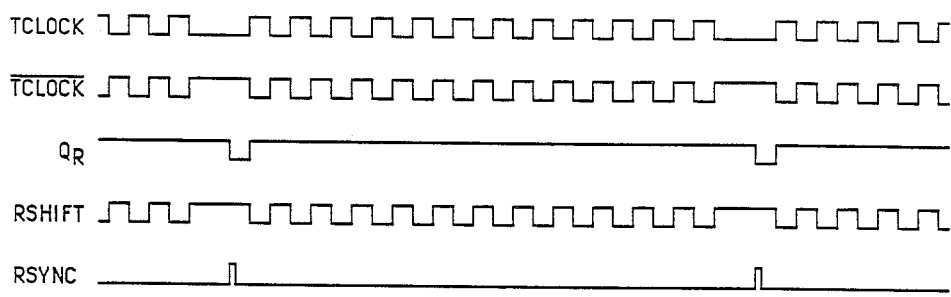
FIG. 7 is a series of graphs illustrating the operation of the timing regenerator of FIG. 6.

A particularly advantageous embodiment of the timing regenerator 9 is shown in FIG. 6, which may be better understood by reference to FIG. 7, which is a timing diagram for the signals in FIG. 6. The signal TCLOCK from line receiver 7 contains the sequence of N clock pulses alternating with the omission of clock pulses for $M=1$ clock cycles. which sequence was originated by the transmitter timing generator 1. TCLOCK is applied to the positive edge trigger input of retriggerable one-shot multivibrator 60 and to inverter 64.

As stated above, TCLOCK is applied to the positive edge trigger input of the retriggerable one-shot multivibrator 60 (hereinafter called "ROS"). An example of the ROS 60 is the IC type 74LS123, which has an output signal $Q_R$ which goes high when a positive-going signal arrives at the positive trigger input and which output signal $Q_R$ stays high for a time interval $T_R$ after the last occurance of a positive trigger pulse, the time interval $T_R$ being determined by the timing resistor 62 and the timing capacitor 61. Thus output signal $Q_R$ goes low at a time $T_R$ after the last occurance of a rising transition of a clock pulse on the signal TCLOCK and may be used as a "missing pulse detector" if the one-shot interval $T_R$ is chosen accordingly. Adequate stability is obtained if resistor 62 and capacitor 63 are chosen to have low temperature coefficients, as are exhibited, for example, by certain thin film resistors and dipped mica capacitors.

One-shot multivibrator 66 is triggered by the falling edge of ROS output $Q_R$ and produces short pulse RSYNC, used to signal the missing pulse interval. The length of RSYNC is not critical, and is determined by timing resistor 68 and capacitor 67. The receiver shift clocks, RSHIFT, are produced by gate 65 while $Q_R$ is high. Because of inverter 64, the rising edges of receiver shift clocks RSHIFT are delayed by one half a clock cycle in order to guarantee that the shift operations of SIPOSR 51 and clock operations of output word latch 52 occur one half clock period after arrival of the data bits at the receiving subsection in order to prevent false data reception caused by timing contentions.

As may be deduced from FIG. 7 an advantageous choice of the duration, $T_R$, of the timed output pulse of the ROS multivibrator 60 is $T_R=1.5$ transmitter clock periods, because in that case the missing pulse detection, happening when $Q_R$ goes low, takes place at the midpoint of the missing pulse interval, offering thereby significant safety from false detection. This is consistent with the analysis presented earlier in TABLE 1.

Line drivers 3 and 4, transmission lines 5 and 6, and line receivers 7 and 8 all must be considered in conjunction with the system requirements of transmission distance and required transmission data bit rate, as discussed above in the background section of this document. In order for the relative timing of the TSHIFT/TCLOCK and SERIAL DATA/SERDATA signals to be preserved, the transmission lines 5 and 6 should be of identical constitution and of electrical lengths equal to within a small fraction of a clock period of the transmitter timing generator.

Best bandwidth-distance performance is afforded by employing optical fiber transmission lines for 5 and 6, by using digital to optical line drivers 3 and 4, and by using optical to digital line receivers 7 and 8. Such devices are commercially available, and also provide excellent noise immunity.

When electrically conducting transmission lines are employed, the preferred embodiment is twin twisted-pair transmission lines, such as Belden type 9829, in conjunction with differential line drivers and receivers, such as DM8830/SN75183 AND DM8820A/SN75182. The DM8820A/ SN75182 differential line receivers have the additional advantage of a time response control input, which may be used to discriminate further against noise. Such a configuration has been used extensively by the inventor at Mt. Wilson, Calif., one of the most electronically noisy sites in the United States.

Figure 8:
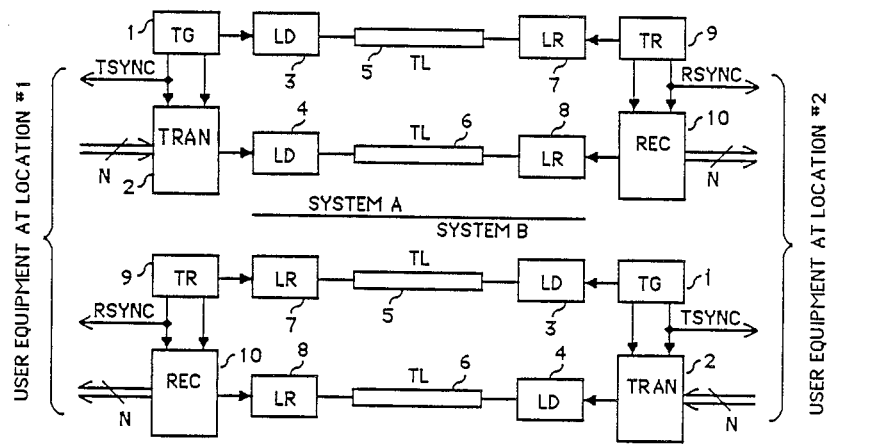
FIG. 8 is a block and electrical diagram of two asynchronous one-way digital data communication means in accordance with the present invention, so arranged as to provide simultaneous independent communications in both directions between two locations.

Attention is now drawn to FIG. 8, which illustrates an embodiment of the present invention used to provide data communications in both directions between two locations. Two separate but essentially identical means, each configured as shown in FIG. 1 are used, one means, identified as SYSTEM A, for data transmission from equipment at location #1 to equipment at location #2, and one means, identified as SYSTEM B, for data transmission from equipment at location #2 to equipment at location #1.

Examination of this discussion by those skilled in the art will reveal that the system and method of the present invention offer advantages of simplicity, high-performance, low-cost, and reliability, and provide flexibility of design and application.

Although this description has primarily been directed to particular preferred embodiments of the invention, it will be understood that many modifications and variations in construction, arrangement, and use are possible without departing from the true spirit of the present invention. The present invention is accordingly to be considered as including all modifications and variations coming within the scope of the appended claims.

What is claimed is:

1. A communication system for transmitting data from a sending station to a receiving station comprising:
   first channel means for carrying message timing information from the sending station to the receiving station;
   at least one second channel means for carrying message data information from the sending station to the receiving station;
   means for transmitting timing signals from the sending station to the receiving station over the first channel means at a frequency which may be varied over a predetermined range in accordance with at least one characteristic of the first and second channel means; and
   means for transmitting data signals from the sending station to the receiving station over the second channel means at said frequency, the data signals representing data words;

the means for transmitting timing signals including means for interrupting the timing signals following each group of data signals to indicate the end of each corresponding word.

2. The communication system of claim 1 wherein:
the timing signals are timing pulses; and
the data signals are binary data pulses.

3. The communication system of claim 1 which further comprises:
means for receiving said timing signals at the receiving station;
means for receiving said data signals at the receiving station;
the means for receiving timing signals including means for detecting the interruption of said timing signals; and
the means for receiving data signals including means for separating the received data signals into groups in response to the means for detecting the interruption of the timing signals.

4. The communication system of claim 3 wherein:
the means for receiving timing signals further comprises means for detecting the frequency of received timing signals; and
the means for receiving data signals includes means for sensing data signals at the detected frequency of said timing signals.

5. A method of transmitting data from a sending station to a receiving station comprising the steps of:
providing first channel means for carrying message timing information from the sending station to the receiving station;
providing at least one second channel means for carrying message data information from the sending station to the receiving station;
transmitting timing signals from the sending station to the receiving station over the first channel means at a frequency which may be varied over a predetermined range in accordance with at least one characteristic of the first and second channel means; and
transmitting data signals from the sending station to the receiving station over the second channel means at said frequency, the data signals being divided into a plurality of groups of signals representing data words;
wherein the step of transmitting timing signals includes the interruption of the timing signals following each group of data signals to indicate the end of each corresponding word.

6. The method of claim 5 wherein: the timing signals are timing pulses; and the data signals are binary data pulses.

7. The method of claim 5 which further comprises the steps of:
receiving said timing signals and data signals at the receiving station;
detecting the interruption of the timing signals as the timing signals are received; and
separating received data signals into groups delineated by the interruption of the timing signals.

8. The method of claim 7 which further comprises the steps of:
detecting the frequency of the received timing signals at the receiving station; and sensing the received data signals at said frequency.

* * * * *